(12) United States Patent
Nishizawa et al.

(10) Patent No.: US 8,866,635 B2
(45) Date of Patent: Oct. 21, 2014

(54) SMART METER EVALUATION DEVICE AND SMART METER EVALUATION METHOD

(75) Inventors: Makoto Nishizawa, Atsugi (JP); Taku Hasegawa, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 570 days.

(21) Appl. No.: 13/310,969

(22) Filed: Dec. 5, 2011

(65) Prior Publication Data

US 2012/0200424 A1 Aug. 9, 2012

(30) Foreign Application Priority Data

Feb. 3, 2011 (JP) ................................. 2011-021655

(51) Int. Cl.
*G08B 23/00* (2006.01)
*G01R 13/00* (2006.01)
*H04B 17/00* (2006.01)

(52) U.S. Cl.
CPC ........ *H04B 17/0065* (2013.01); *H04B 17/0057* (2013.01)
USPC ...................................... 340/870.02; 702/66

(58) Field of Classification Search
CPC ............................ Y02B 90/244; G01R 22/061
USPC ........................................................ 702/66
See application file for complete search history.

(56) References Cited

U.S. PATENT DOCUMENTS

2002/0199210 A1* 12/2002 Shi et al. ..................... 725/144
2011/0145611 A1* 6/2011 Lee ............................... 713/320

FOREIGN PATENT DOCUMENTS

JP 2010128810 A 6/2010

* cited by examiner

*Primary Examiner* — Steven Lim
*Assistant Examiner* — Omeed Alizada
(74) *Attorney, Agent, or Firm* — Pearne & Gordon LLP

(57) ABSTRACT

[Task] To provide a smart meter evaluation device and a smart meter evaluation method capable of evaluating the operating state of a smart meter.
[Means for Resolution] A smart meter evaluation device includes a demodulating unit that converts a baseband signal into digital data and outputs demodulated data, a communication information acquiring unit that acquires communication information included in the demodulated data, a signal waveform acquiring unit that acquires the waveform of the baseband signal, a signal level measuring unit that measures the level of the baseband signal, a smart meter management unit that specifies a smart meter, which is a transmission source of the demodulated data, a signal type specifying unit that specifies the signal type of the demodulated data, and a display unit that displays data, such as the communication information, the signal waveform, the signal level, smart meter specification information, and the signal type.

4 Claims, 6 Drawing Sheets

SMART METER EVALUATION DEVICE AND SMART METER EVALUATION METHOD

TECHNICAL FIELD

The present invention relates to a smart meter evaluation device and a smart meter evaluation method that evaluate the operating state of a smart meter.

BACKGROUND ART

In recent years, the introduction of a device called a smart meter in which a communication function is given to a wattmeter or a gas meter has been examined. For example, Patent Document 1 discloses a smart meter that measures power consumption.

The smart meter disclosed in Patent Document 1 includes meter reading means that is connected to an automated meter reader which automatically acquires information of the power consumption of each customer through a network and acquires meter value data of each customer, meter value data transmitting means for transmitting the meter value data to the automated meter reader, and a notice receiving unit for receiving a predetermined notice from the automated meter reader. According to this structure, the smart meter disclosed in Patent Document 1 can acquire data of the power consumption of each customer at a predetermined interval or transmit a notice to suppress power consumption to each customer.

RELATED ART DOCUMENT

Patent Document

[Patent Document 1] JP-A-2010-128810

DISCLOSURE OF THE INVENTION

Problem that the Invention is to Solve

As described above, the smart meter is capable of acquiring the information of power consumption or receiving a predetermined notice and improves convenience. However, a device that evaluates the operating state of the smart meter has not been proposed.

The invention has been made in view of the above-mentioned problems and an object of the invention is to provide a smart meter evaluation device and a smart meter evaluation method capable of evaluating the operating state of a smart meter.

Means for Solving Problem

According to a first aspect of the invention, there is provided a smart meter evaluation device (10) that evaluates the operating state of a plurality of smart meters (1 to 5) which are connected to a network and transmit or receive a radio-frequency signal according to a predetermined communication protocol. The smart meter evaluation device (10) includes: a receiving unit (21) for receiving the radio-frequency signal and converting the radio-frequency signal into a baseband signal; a demodulating unit (41a) for converting the baseband signal into digital data and outputting the digital signal as demodulated data; a signal type specifying unit (45) for specifying the signal type of the demodulated data; a communication information acquiring unit (41b) for acquiring communication information included in the demodulated data; a signal waveform acquiring unit (41c) for acquiring the waveform of the baseband signal; and a display unit (33) for displaying the signal type, the communication information, and the signal waveform.

According to this structure, the smart meter evaluation device according to the first aspect of the invention acquires the signal type, the communication information, and the signal waveform from the communication signal of the smart meter and the display means displays the signal type, the communication information, and the signal waveform. Therefore, it is possible to evaluate the operating state of the smart meter.

According to a second aspect of the invention, the smart meter evaluation device may further include: a smart meter management unit (44) for specifying the smart meter, which is a transmission source of the demodulated data; and a signal level measuring unit (42) for measuring the level of the baseband signal. The smart meter management unit may specify the smart meter, which is the transmission source of the demodulated data, on the basis of the signal level.

According to this structure, the smart meter evaluation device according to the second aspect of the invention can specify the smart meter, which is the transmission source of the received data.

According to a third aspect of the invention, the smart meter evaluation device may further include a determining unit (43) for detecting whether the signals from the plurality of smart meters collide with each other in one smart meter on the basis of the signal level.

According to this structure, the smart meter evaluation device according to the third aspect of the invention can detect whether signal collision occurs in one smart meter.

According to a fourth aspect of the invention, there is provided a smart meter evaluation method that evaluates the operating state of a plurality of smart meters (1 to 5) which are connected to a network and transmit or receive a radio-frequency signal according to a predetermined communication protocol. The smart meter evaluation method includes: a receiving step of receiving the radio-frequency signal and converting the radio-frequency signal into a baseband signal; a demodulating step of converting the baseband signal into digital data and outputting the digital data as demodulated data; a signal type specifying step of specifying the signal type of the demodulated data; a communication information acquiring step of acquiring communication information included in the demodulated data; a signal waveform acquiring step of acquiring the waveform of the baseband signal; and a display step of displaying the signal type, the communication information, and the signal waveform.

According to this structure, in the smart meter evaluation method according to the fourth aspect of the invention, the signal type, the communication information, and the signal waveform are displayed in the display step. Therefore, it is possible to evaluate the operating state of the smart meter.

According to a fifth aspect of the invention, the smart meter evaluation method may further include: a signal level measuring step of measuring the level of the baseband signal; and a signal collision detecting step of detecting whether the signals from the plurality of smart meters collide with each other in one smart meter on the basis of the signal level.

According to this structure, the smart meter evaluation method according to the fifth aspect of the invention can detect whether signal collision occurs in one smart meter.

Advantage of the Invention

The invention can provide a smart meter evaluation device and a smart meter evaluation method capable of evaluating the operating state of a smart meter.

BEST MODE FOR CARRYING OUT THE INVENTION

Hereinafter, an embodiment of the invention will be described with reference to the accompanying drawings. An example in which a smart meter evaluation device according to the invention is applied to evaluate a smart meter that measures power consumption will be described.

Figure 1:
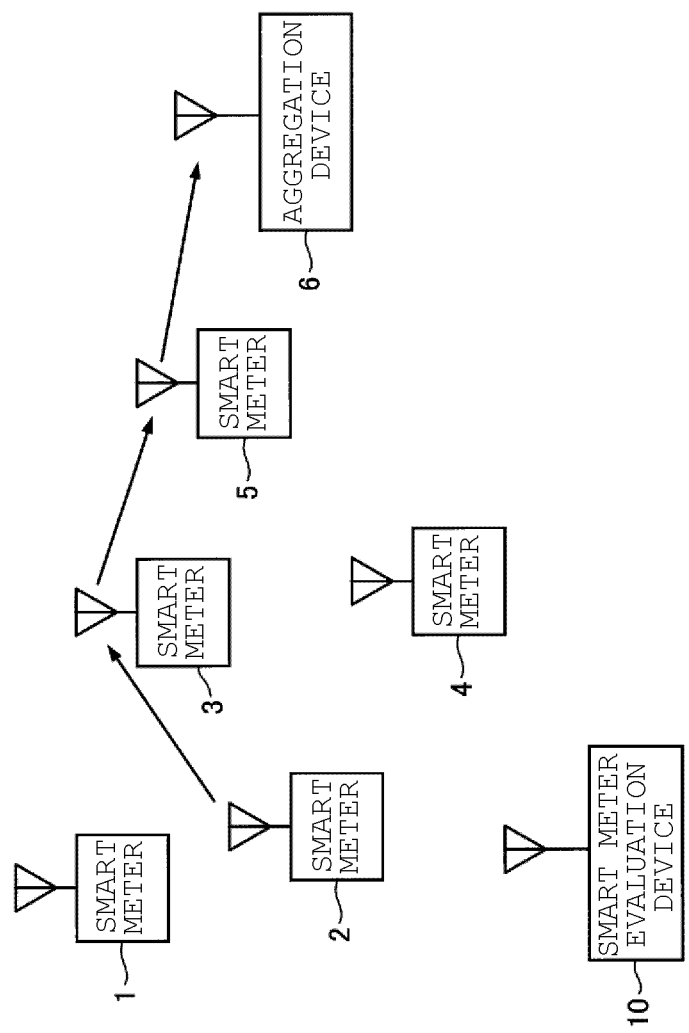
FIG. 1 is a diagram schematically illustrating an example of the application of a smart meter evaluation device according to the invention.

FIG. 1 is a diagram schematically illustrating an example of the application of a smart meter evaluation device 10 according to this embodiment. In FIG. 1, smart meters 1 to 5 are installed in, for example, houses and measure the power consumption of the houses. Each of the smart meters 1 to 5 has a wireless communication function, autonomously forms a wireless ad-hoc network, changes the data of the measured power consumption into a packet according to a predetermined communication protocol, and transmits the packet to an aggregation device 6 using multihop communication. For example, ZigBee (registered trademark) is used as the communication protocol. The ZigBee covers the range over a network layer of an OSI reference model and IEEE 802.15.4 is used for the physical layer and a MAC (Media Access Control) layer.

FIG. 1 shows a state in which the smart meter 2 transmits a packet including the data of the measured power consumption to the aggregation device 6 through the smart meters 3 and 5. The smart meter evaluation device 10 according to this embodiment can receive communication signals of the smart meters 1 to 5 and analyze the communication signals. Next, the structure of the smart meter evaluation device 10 will be described.

Figure 2:
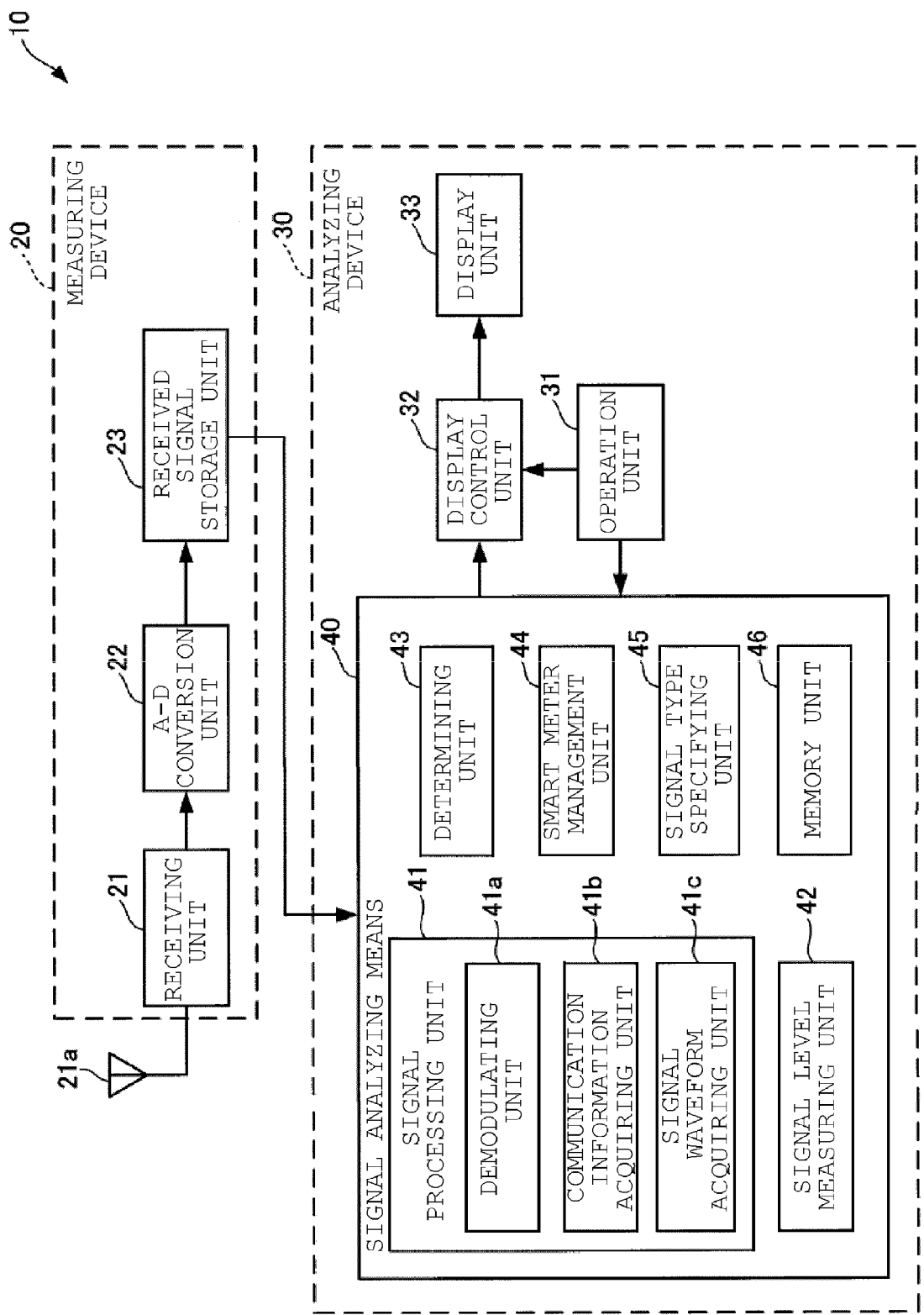
FIG. 2 is a block diagram illustrating the structure of a smart meter evaluation device according to an embodiment of the invention.

As shown in FIG. 2, the smart meter evaluation device 10 includes a measuring device 20 and an analyzing device 30.

The measuring device 20 includes a receiving unit 21, an A-D (analog-digital) conversion unit 22, and a received signal storage unit 23. The receiving unit 21 includes an antenna 21a, receives radio-frequency communication signals from the smart meters 1 to 5, performs frequency conversion to convert the signals into baseband signals, and outputs the signals to the A-D conversion unit 22. The receiving unit 21 is receiving means according to the invention. The A-D conversion unit 22 converts the baseband signal from an analog value to a digital value. The received signal storage unit 23 stores the digital baseband signal. The measuring device 20 has a measuring function of receiving various kinds of signals and performing various kinds of measuring processes. However, the measuring function is not directly related to the invention and thus the structure related to the measurement is not shown.

The analyzing device 30 includes signal analyzing means 40, an operation unit 31, a display control unit 32, and a display unit 33. Although not shown in the drawings, the analyzing device 30 includes a control circuit, for example, having a CPU that controls the overall operation of the analyzing device 30, and a ROM and a RAM that store a program for allowing the CPU to function as various units.

The signal analyzing means 40 includes a signal processing unit 41, a signal level measuring unit 42, a determining unit 43, a smart meter management unit 44, a signal type specifying unit 45, and a memory unit 46. The signal processing unit 41 includes a demodulating unit 41a, a communication information acquiring unit 41b, and a signal waveform acquiring unit 41c.

The demodulating unit 41a reads the baseband signal to be evaluated from the received signal storage unit 23, converts (demodulates) the baseband signal into digital data, and outputs the data as demodulated data. The demodulating unit 41a also decodes the demodulated data, if necessary. The demodulating unit 41a is demodulating means according to the invention.

The communication information acquiring unit 41b acquires communication information included in the demodulated data. The communication information includes, for example, header information, communication log information, and power consumption data. The communication information acquiring unit 41b is communication information acquiring means according to the invention.

The signal waveform acquiring unit 41c reads the baseband signal to be evaluated from the received signal storage unit 23 and acquires the waveform of the baseband signal in order to display the waveform of the baseband signal on the display unit 33. The signal waveform acquiring unit 41c is signal waveform acquiring means according to the invention.

The signal level measuring unit 42 reads the baseband signal to be evaluated from the received signal storage unit 23 and measures the level of the read baseband signal. The signal level measuring unit 42 is signal level measuring means according to the invention.

The determining unit 43 performs various kinds of determination processes according to the settings of the operation unit 31, which will be described below. For example, the determining unit 43 determines whether signal collision (packet collision) occurs or whether received data is normal in a given smart meter. The determining unit 43 is signal collision detecting means according to the invention.

The smart meter management unit 44 acquires related information in which the smart meter is associated with the level of the baseband signal in advance and specifies the smart meter, which is the transmission source of the data demodulated by the demodulating unit 41a, on the basis of the related information and the signal level measured by the signal level measuring unit 42. The smart meter management unit 44 is smart meter specifying means according to the invention. The smart meter management unit 44 may specify the smart meter, which is the transmission source of the demodulated data, with reference to the communication logs of the smart meters 1 to 5.

The signal type specifying unit 45 specifies the signal type of the data demodulated by the demodulating unit 41*a*. For example, the signal type specifying unit 45 may specify, for example, a beacon signal, a data signal, an Ack (Acknowledgement) signal, and a MAC command signal, as a signal type from the header information of the demodulated data. The signal type specifying unit 45 is signal type specifying means according to the invention.

The memory unit 46 stores data, such as the communication information acquired by the communication information acquiring unit 41*b*, the waveform of the baseband signal acquired by the signal waveform acquiring unit 41*c*, the signal level measured by the signal level measuring unit 42, smart meter specification information specified by the smart meter management unit 44, and the signal type specified by the signal type specifying unit 45.

The operation unit 31 is operated by the evaluator to set, for example, determination conditions and analysis items or analysis conditions analyzed by the signal analyzing means 40. For example, although not shown in the drawings, the operation unit 31 includes, for example, a display which displays a setting screen for setting various conditions, an input device, such as a keyboard, a dial, or a mouse, and a control circuit which controls the display and the input device.

The display control unit 32 performs display control to display each data item stored in the memory unit 46 for each smart meter on the display unit 33 according to the settings of the operation unit 31.

The display unit 33 is, for example, a liquid crystal monitor and displays the output signal from the display control unit 32. The display unit 33 is display means according to the invention.

Next, the operation of the smart meter evaluation device 10 according to this embodiment will be described. It is assumed that the received signal storage unit 23 stores the baseband signal to be evaluated.

When the evaluator operates the operation unit 31, the following operation is performed in the signal analyzing means 40.

The demodulating unit 41*a* reads the baseband signal to be evaluated from the received signal storage unit 23, converts (demodulates) the baseband signal into digital data, and stores the demodulated data, communication information included in the demodulated data, and the signal waveform data of the demodulated data in the memory unit 46.

The signal level measuring unit 42 measures the level of the baseband signal corresponding to the data demodulated by the demodulating unit 41*a* and stores the data of the measurement result in the memory unit 46 so as to be associated with the demodulated data.

The determining unit 43 performs various kinds of determination processes according to the settings of the operation unit 31. For example, the determining unit 43 determines whether the demodulation result of the demodulating unit 41*a* is normal, whether there is an error in the smart meter, or whether signal collision occurs, and stores the data of the determination result in the memory unit 46.

The smart meter management unit 44 specifies the smart meter, which is the transmission source of the data demodulated by the demodulating unit 41*a*, on the basis of the signal level measured by the signal level measuring unit 42 and stores the data of the specification result in the memory unit 46.

The signal type specifying unit 45 specifies the signal type of the data demodulated by the demodulating unit 41*a* and stores the data of the specification result in the memory unit 46.

Figure 3:
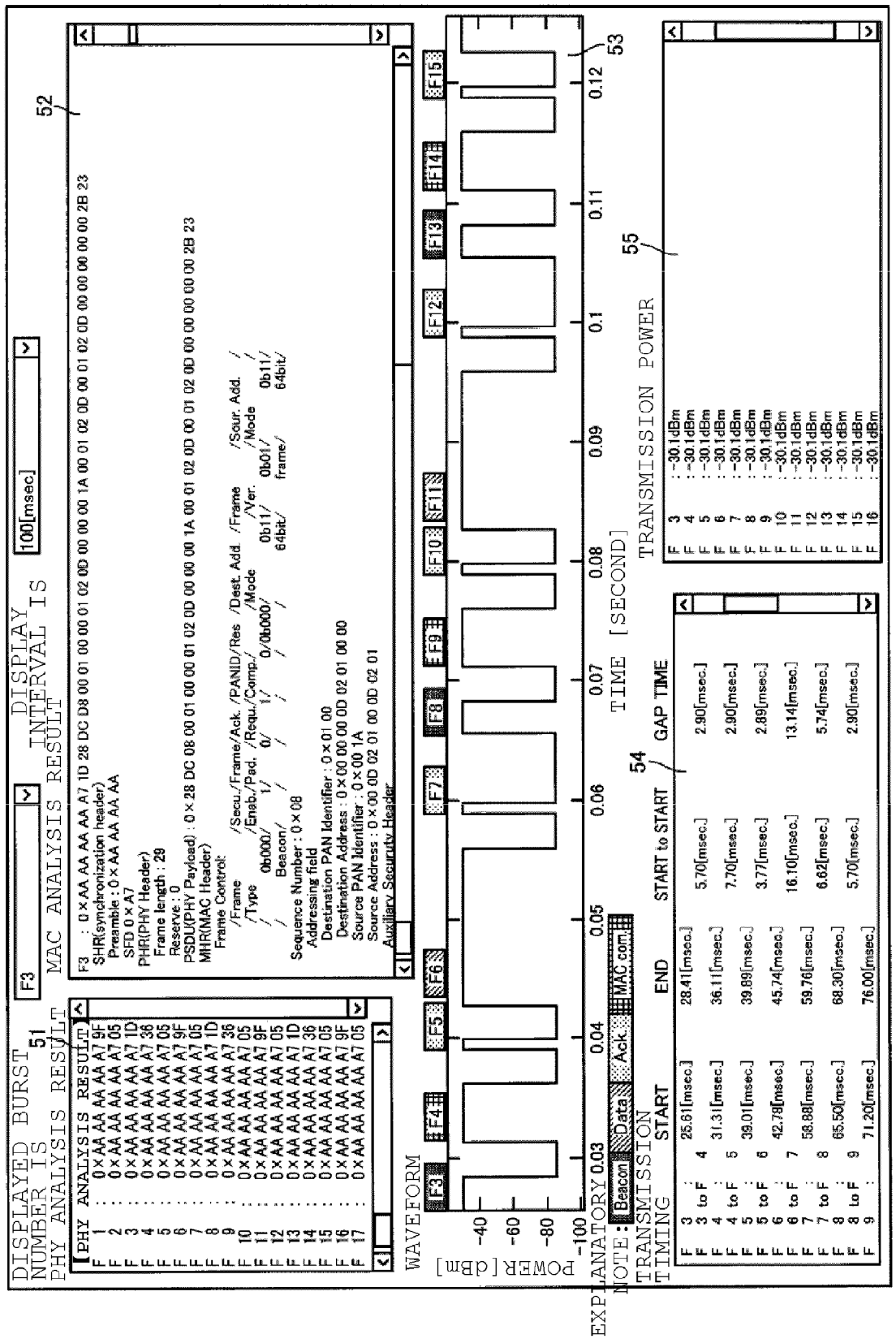
FIG. 3 is a diagram illustrating an example of the display of a display unit in the smart meter evaluation device according to the embodiment of the invention.

When the evaluator operates the operation unit 31, the display control unit 32 reads each data item stored in the memory unit 46 and displays the read data on the display unit 33. As a result, for example, the display unit 33 displays a display screen shown in FIG. 3. FIG. 3 is a diagram illustrating an example of the display of the display unit 33.

The display screen of the display unit 33 includes a display area 51 that displays a PHY (physical layer) analysis result, a display area 52 that displays a MAC analysis result, a display area 53 that displays the waveform of each communication signal, a display area 54 that displays the transmission timing of each communication signal, and a display area 55 that displays the transmission power of each communication signal.

In the display example shown in FIG. 3, the communication of a signal F3 in the communication information acquired by the communication information acquiring unit 41*b* is displayed in the display area 52. The evaluator views the display area 52 to know the details of the communication content by the communication protocol. Therefore, it is easy for the evaluator to know which data is received. Specifically, information, such as the identification number of the smart meter, which is a transmission source, information indicating whether communication data is encrypted, an encryption type, the destination of data, such as power consumption, the content of data, such as power consumption, and measurement conditions, is displayed in the display area 52.

Each signal and the waveform (baseband signal waveform) of the signal represented by a time axis and a power axis are displayed in the display area 53 so as to be identified. For example, the signals are displayed in the display area 53 such that it is easy to know that the signal F3 is a beacon signal, a signal F4 is a MAC command signal, a signal F5 is an Ack signal, and a signal F6 is a data signal. As an example of the identification display, there is a method of displaying areas indicating each signal name in different colors. For example, the waveform of a transmission signal for each smart meter, which is a transmission source, may be displayed so as to be identified or it may be displayed with characters so as to be identified.

The position of each signal on the time axis or a time interval (GAP TIME) between adjacent signals is displayed in the display area 54.

Next, a signal collision determining operation of the smart meter evaluation device 10 according to this embodiment will be described. A process of managing the synchronization of the transmission of signals is not performed in the ZigBee/IEEE 802.15.4 standard. Therefore, the determination of the signal collision is performed in order to prevent signal collision in a given smart meter.

Figure 4:
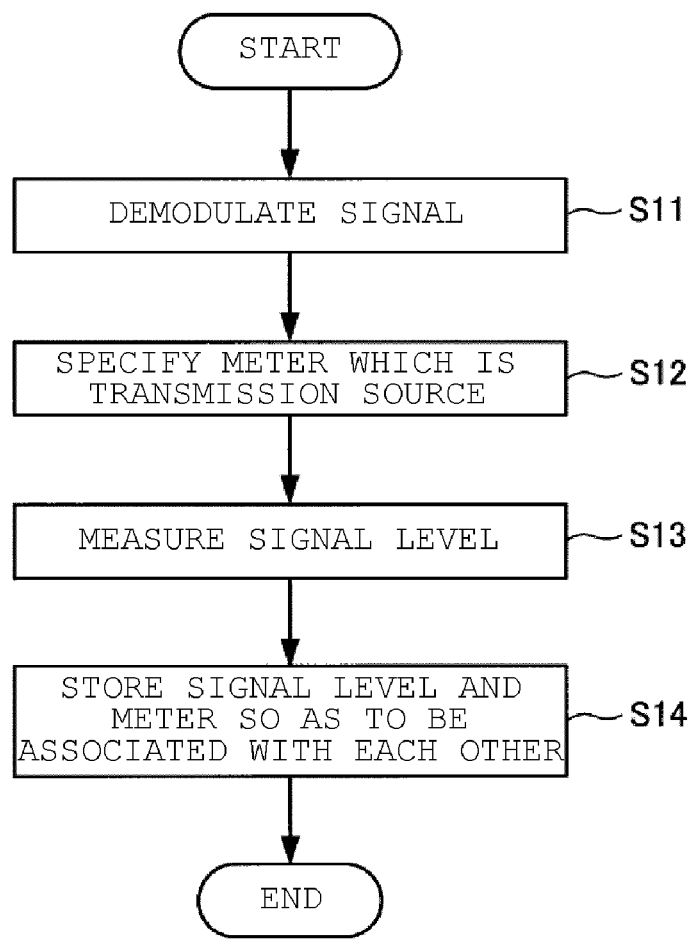
FIG. 4 is a flowchart illustrating an operation in a preparatory stage before the determination of signal collision in the smart meter evaluation device according to the embodiment of the invention.

First, the smart meter evaluation device 10 performs an operation in a preparatory stage shown in FIG. 4 before the determination of the signal collision.

The demodulating unit 41*a* reads the baseband signal stored in the received signal storage unit 23, converts (demodulates) the baseband signal into digital data (Step S11) and outputs the demodulated data to the memory unit 46.

The smart meter management unit 44 specifies the smart meter, which is the transmission source of the demodulated data, with reference to the header information of the demodulated data (Step S12).

The signal level measuring unit 42 measures the average value of the level of the baseband signal corresponding to the demodulated data for each smart meter (Step S13).

The smart meter management unit 44 stores data in which the level of the baseband signal corresponding to the demodulated data measured by the signal level measuring unit 42 is associated with the smart meter, which is the transmission source of the demodulated data, in the memory unit 46 (Step S14).

Figure 5:
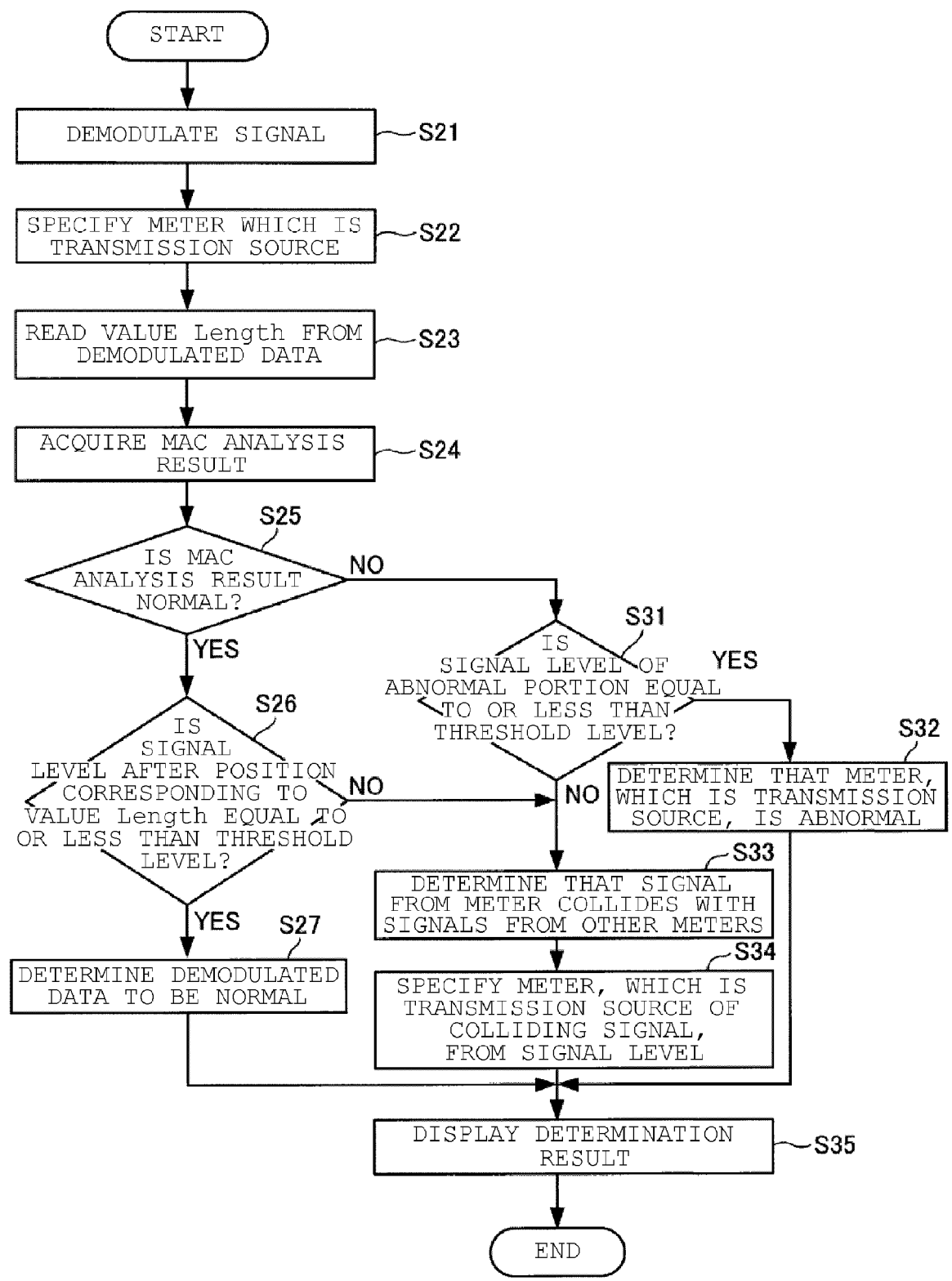
FIG. 5 is a flowchart illustrating a signal collision determining operation of the smart meter evaluation device according to the embodiment of the invention.
Figure 6:
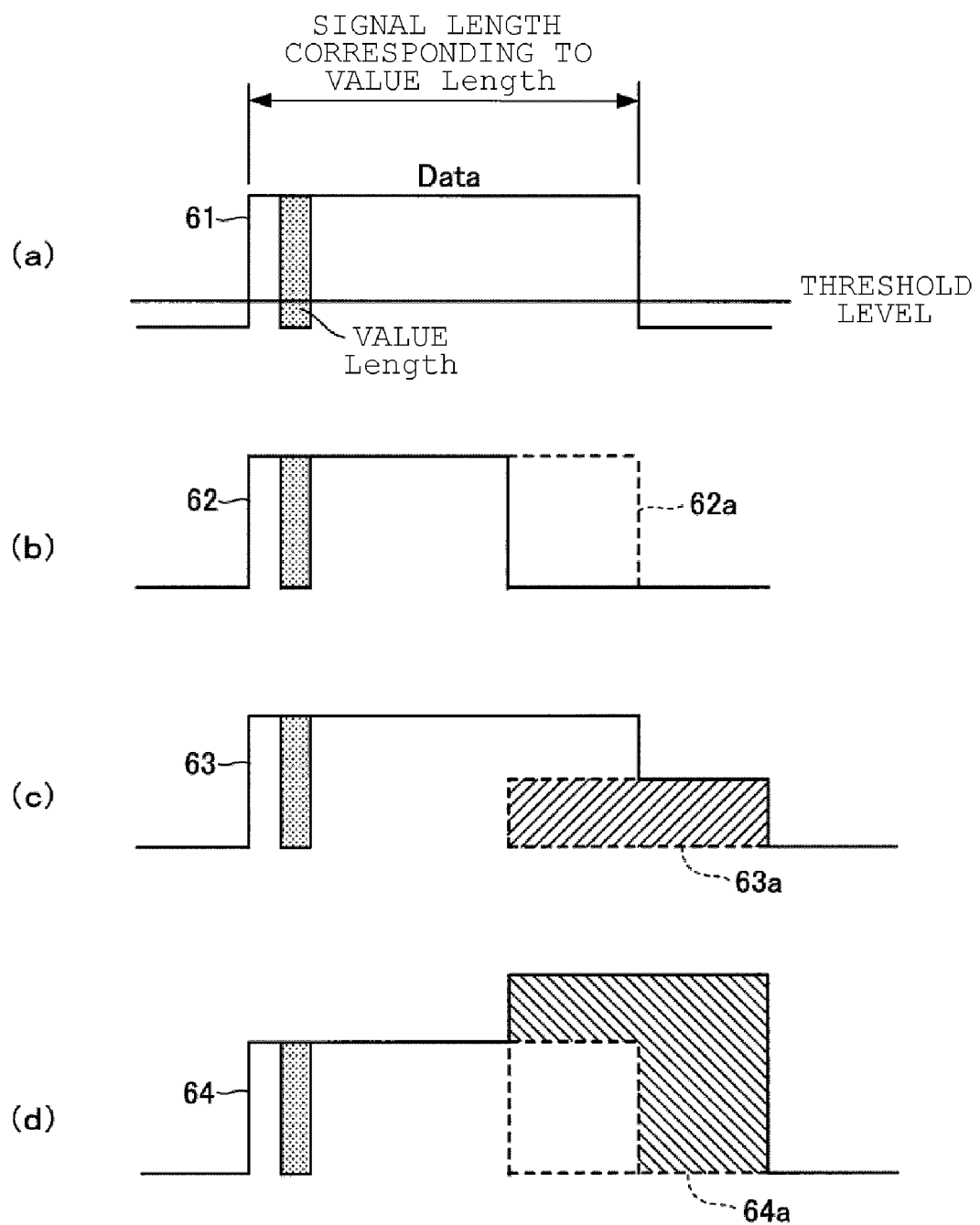
FIG. 6 is a diagram illustrating an example of the waveform of demodulated data in the smart meter evaluation device according to the embodiment of the invention.

Next, the signal collision determining operation of the smart meter evaluation device 10 will be described with reference to FIGS. 5 and 6.

The demodulating unit 41a reads the baseband signal to be evaluated from the received signal storage unit 23 and converts (demodulates) the baseband signal into digital data (Step S21). Then, the demodulating unit 41a outputs the demodulated data to the memory unit 46.

The smart meter management unit 44 specifies the smart meter, which is the transmission source of the demodulated data, with reference to the header information of the demodulated data (Step S22).

The communication information acquiring unit 41b reads a value Length included in the header information of the demodulated data (Step S23). The value Length indicates the length of the demodulated data. It is possible to estimate the length of a corresponding signal (time length) from the value Length. As a result, for example, data 61 shown in FIG. 6(a) can be demodulated to the position corresponding to the value Length. In addition, the communication information acquiring unit 41b analyzes the MAC header of the demodulated data and acquires the MAC analysis result (Step S24).

The determining unit 43 determines whether the MAC analysis result is normal (Step S25). The normal MAC analysis result means that meaningful data based on the ZigBee/IEEE 802.15.4 standard is obtained from the analysis result of the MAC header by the communication information acquiring unit 41b.

When it is determined in Step S25 that the MAC analysis result is normal, the determining unit 43 determines whether the signal level after the position corresponding to the value Length is equal to or less than a threshold level (see FIG. 6(a)) (Step S26). When it is determined in Step S26 that the signal level after the position corresponding to the value Length is equal to or less than the threshold level, the demodulated data is determined to be normal (Step S27) and the display control unit 32 displays the determination result on the display unit 33 (Step S35).

When it is determined in Step S25 that the MAC analysis result is not normal, that is, the MAC analysis result is abnormal, the determining unit 43 determines whether the signal level of an abnormal portion in the MAC analysis result is equal to or less than a threshold level (Step S31). When it is determined in Step S31 that the signal level of the abnormal portion in the MAC analysis result is equal to or less than the threshold level, the determining unit 43 determines that the smart meter, which is the transmission source of the demodulated data, is abnormal (Step S32) and the process proceeds to Step S35.

For example, in data 62 shown in FIG. 6(b), data 62a which is the latter part of the data 62, is lost. Therefore, the data 62 cannot be demodulated to the position corresponding to the value Length, and it is determined that a portion of the data 62 corresponding to the lost data 62a is an abnormal portion of the MAC analysis result and the signal level of the abnormal portion is equal to or less than the threshold level.

When it is determined in Step S26 that the signal level after the position corresponding to the value Length is not equal to or more than the threshold level and when it is determined in Step S31 that the signal level of the abnormal portion in the MAC analysis result is not equal to or less than the threshold level (for example, FIGS. 6(c) and 6(d)), the determining unit 43 determines that the signal from the smart meter, which is the transmission source of the demodulated data, collides with the signals from the other smart meters (Step S33).

Specifically, data 63a collides with the latter part of data 63 shown in FIG. 6(c) and overlaps the latter part. Data 64a collides with the latter part of data 63 shown in FIG. 6(d) and overlaps the latter part.

When the determination result of Step S33 is obtained, the smart meter management unit 44 specifies the smart meter, which is the transmission source of the colliding signal, from the signal level of the demodulated data (Step S34) and the process proceeds to Step S35. For example, the smart meter management unit 44 can specify each smart meter, which is a transmission source, on the basis of the signal level of each of the data items 63a and 64a shown in FIGS. 6(c) and 6(d) and the related information stored in Step S14 of FIG. 4.

As described above, in the smart meter evaluation device 10 according to this embodiment, since the display unit 33 displays the signal type, the communication information, and the signal waveform, it is possible to evaluate the operating state of the smart meter.

The smart meter evaluation device 10 performs the signal collision determining operation to determine the smart meter in which signal collision occurs on the wireless ad-hoc network, which makes it easy to specify an abnormal portion.

In the above-described embodiment, the smart meter evaluation device 10 evaluates the smart meters connected to the wireless ad-hoc network. However, the smart meter evaluation device 10 may evaluate the smart meters connected to other wireless networks or wired networks.

In the above-described embodiment, the smart meter evaluation device 10 evaluates the smart meter that measures power consumption, but the invention is not limited thereto. The smart meter evaluation device 10 may evaluate smart meters that measure the amount of gas or water used and various kinds of sensor networks.

INDUSTRIAL APPLICABILITY

As described above, the smart meter evaluation device and the smart meter evaluation method according to the invention that evaluate the operating state of the smart meter have an effect of evaluating the operating state of the smart meter and are useful as a smart meter evaluation device and a smart meter evaluation method that evaluate the operating state of a smart meter that measures power consumption or gas consumption.

DESCRIPTION OF REFERENCE NUMERALS AND SIGNS

1 TO 5: SMART METER
6: AGGREGATION DEVICE
10: SMART METER EVALUATION DEVICE
20: MEASURING DEVICE
21: RECEIVING UNIT (RECEIVING MEANS)
21a: ANTENNA
22: A-D CONVERSION UNIT
23: RECEIVED SIGNAL STORAGE UNIT
30: ANALYZING DEVICE
31: OPERATION UNIT
32: DISPLAY CONTROL UNIT
33: DISPLAY UNIT (DISPLAY MEANS)

40: SIGNAL ANALYZING MEANS
41: SIGNAL PROCESSING UNIT
41a: DEMODULATING UNIT (DEMODULATING MEANS)
41b: COMMUNICATION INFORMATION ACQUIRING UNIT (COMMUNICATION INFORMATION ACQUIRING MEANS)
41c: SIGNAL WAVEFORM ACQUIRING UNIT (SIGNAL WAVEFORM ACQUIRING MEANS)
42: SIGNAL LEVEL MEASURING UNIT (SIGNAL LEVEL MEASURING MEANS)
43: DETERMINING UNIT (SIGNAL COLLISION DETECTING MEANS)
44: SMART METER MANAGEMENT UNIT (SMART METER SPECIFYING MEANS)
45: SIGNAL TYPE SPECIFYING UNIT (SIGNAL TYPE SPECIFYING MEANS)
46: MEMORY UNIT
51 TO 55: DISPLAY AREA
61 TO 64 (62a, 63a, 64a): DATA

The invention claimed is:

1. A smart meter evaluation device that receives a signal according to a predetermined communication protocol in a wireless ad-hoc network including a plurality of smart meters that measure the amount of consumption and acquire meter value data, and evaluates a communication state of the plurality of smart meters, comprising:
a receiving unit for receiving a radio-frequency signal and converting the radio-frequency signal into a baseband signal;
a demodulating unit for converting the baseband signal into digital data and outputting the digital data as demodulated data;
a signal type specifying unit for specifying the signal type of the demodulated data on the basis of header information included in the demodulated data;
a communication information acquiring unit for acquiring communication information which is included in the demodulated data and includes at least the meter value data;
a signal waveform acquiring unit for acquiring the waveform of the baseband signal;
a display unit for displaying the signal type, the communication information, and the signal waveform;
a determining unit for detecting whether the signals from the plurality of smart meters collide with each other in one smart meter on the basis of a signal level of the baseband signal.

2. The smart meter evaluation device according to claim 1, further comprising:
a smart meter management unit for specifying the smart meter, which is a transmission source of the demodulated data; and
a signal level measuring unit for measuring the signal level of the baseband signal,
wherein the smart meter management unit specifies the smart meter, which is the transmission source of the demodulated data, on the basis of the signal level.

3. A smart meter evaluation method that receives a signal according to a predetermined communication protocol in a wireless ad-hoc network including a plurality of smart meters that measure the amount of consumption and acquire meter value data and evaluates a communication state of the plurality of smart meters, comprising:
a receiving step of receiving a radio-frequency signal and converting the radio-frequency signal into a baseband signal;
a demodulating step of converting the baseband signal into digital data and outputting the digital data as demodulated data;
a signal type specifying step of specifying the signal type of the demodulated data on the basis of header information included in the demodulated data;
a communication information acquiring step of acquiring communication information which is included in the demodulated data and includes at least the meter value data;
a signal waveform acquiring step of acquiring the waveform of the baseband signal; and
a display step of displaying the signal type, the communication information, and the signal waveform;
a signal collision detecting step of detecting whether the signals from the plurality of smart meters collide with each other in one smart meter on the basis of a signal level of the baseband signal.

4. The smart meter evaluation method according to claim 3, further comprising:
a smart meter specifying step of specifying the smart meter, which is a transmission source of the demodulated data; and
a signal level measuring step of measuring the signal level of the baseband signal,
wherein the smart meter specifying step specifies the smart meter, which is the transmission source of the demodulated data, on the basis of the signal level.

* * * * *